(12) United States Patent
O'Leary et al.

(10) Patent No.: US 7,597,219 B2
(45) Date of Patent: Oct. 6, 2009

(54) ROTARY VALVE FOR HANDLING SOLID PARTICULATE MATERIAL

(75) Inventors: Robert J. O'Leary, Newark, OH (US); Alvin L. Miller, Newark, OH (US); John Hasselbach, Granville, OH (US); Michael W. Johnson, Lithopolis, OH (US)

(73) Assignee: Owens Corning Intellectual Capital, LLC DE (US)

( * ) Notice: Subject to any disclaimer, the term of this patent is extended or adjusted under 35 U.S.C. 154(b) by 607 days.

(21) Appl. No.: 11/303,612

(22) Filed: Dec. 16, 2005

(65) Prior Publication Data
US 2007/0138211 A1 Jun. 21, 2007

(51) Int. Cl.
G01F 11/10 (2006.01)

(52) U.S. Cl. .................. 222/368; 222/349; 222/636; 277/555

(58) Field of Classification Search ......... 222/345–352, 222/367–368, 410, 416, 636; 277/543, 545, 277/555; 415/173.3; 416/146 R
See application file for complete search history.

(56) References Cited

U.S. PATENT DOCUMENTS

| 313,251 | A | * | 3/1885 | Taylor | 277/555 |
|---|---|---|---|---|---|
| 1,811,898 | A | * | 6/1931 | Schur et al. | 222/368 |
| 2,049,063 | A | * | 7/1936 | Hubbard | 277/555 |
| 2,273,962 | A | * | 2/1942 | Hubbard | 277/555 |
| 2,404,678 | A | * | 7/1946 | Wuensch | 416/145 |
| 2,754,995 | A | | 7/1956 | Switzer | |
| 2,794,454 | A | * | 6/1957 | Moulthrop | 141/67 |
| 2,938,651 | A | | 5/1960 | Specht et al. | |
| 2,964,896 | A | * | 12/1960 | Finocchiaro | 56/157 |
| 2,984,872 | A | * | 5/1961 | France | 19/48 R |
| 3,076,659 | A | * | 2/1963 | Kremer, Jr. | 277/543 |
| 3,201,007 | A | * | 8/1965 | Transeau | 222/345 |
| 3,231,105 | A | * | 1/1966 | Easley, Jr. | 414/325 |
| 3,512,345 | A | * | 5/1970 | Smith | 56/16.9 |
| 3,556,355 | A | | 1/1971 | Ruiz | |
| 3,591,444 | A | * | 7/1971 | Hoppe | 428/86 |
| 3,869,337 | A | * | 3/1975 | Hoppe et al. | 442/358 |
| 3,895,745 | A | * | 7/1975 | Hook | 222/368 |
| 3,952,757 | A | * | 4/1976 | Huey | 134/134 |
| 4,059,205 | A | | 11/1977 | Heyl | |
| 4,133,542 | A | * | 1/1979 | Janian et al. | 277/555 |
| 4,155,486 | A | * | 5/1979 | Brown | 222/197 |
| 4,179,043 | A | * | 12/1979 | Fischer | 222/368 |
| 4,180,188 | A | * | 12/1979 | Aonuma et al. | 222/368 |

(Continued)

OTHER PUBLICATIONS

Choosing a pneumatic conveying system . . . ; Powder Bulk Engineering; Steve Grant, dated Dec. 2004.

(Continued)

*Primary Examiner*—Kevin P Shaver
*Assistant Examiner*—Andrew P Bainbridge
(74) *Attorney, Agent, or Firm*—James J. Dottavio; Jason S. Fokens

(57) ABSTRACT

A rotary valve including a housing having an inner surface. A rotary assembly is positioned for rotation within the housing. The rotary assembly includes a plurality of radially outwardly extending vanes. The vanes extend toward the inner housing surface and are configured to transport material along the inner housing surface. Seal members are mounted upon the vanes. Spring members are secured to the vanes urging the seal members into contact with the inner housing surface.

19 Claims, 3 Drawing Sheets

U.S. PATENT DOCUMENTS

| | | | |
|---|---|---|---|
| 4,235,354 A | 11/1980 | Aonuma et al. | |
| 4,268,205 A * | 5/1981 | Vacca et al. | 414/219 |
| 4,346,140 A * | 8/1982 | Carlson et al. | 442/65 |
| 4,536,121 A * | 8/1985 | Stewart et al. | 414/219 |
| 4,537,333 A * | 8/1985 | Bjerregaard | 222/345 |
| 4,560,307 A * | 12/1985 | Deitesfeld | 406/63 |
| 4,585,239 A * | 4/1986 | Nicholson | 277/555 |
| 4,695,501 A * | 9/1987 | Robinson | 428/159 |
| 4,784,298 A | 11/1988 | Heep et al. | |
| 4,880,150 A * | 11/1989 | Navin et al. | 222/346 |
| 4,915,265 A | 4/1990 | Heep et al. | |
| 4,919,403 A * | 4/1990 | Bartholomew | 267/165 |
| 5,014,885 A | 5/1991 | Heep et al. | |
| 5,037,014 A * | 8/1991 | Bliss | 222/410 |
| 5,052,288 A * | 10/1991 | Marquez et al. | 99/407 |
| 5,129,554 A * | 7/1992 | Futamura | 222/368 |
| 5,166,236 A * | 11/1992 | Alexander et al. | 524/111 |
| 5,289,982 A * | 3/1994 | Andersen | 241/296 |
| 5,303,672 A * | 4/1994 | Morris | 119/51.11 |
| 5,368,311 A | 11/1994 | Heyl | |
| 5,392,964 A * | 2/1995 | Stapp et al. | 222/368 |
| 5,405,231 A | 4/1995 | Kronberg | |
| 5,472,305 A | 12/1995 | Ikeda et al. | |
| 5,538,383 A | 7/1996 | Ikeda et al. | |
| 5,620,116 A * | 4/1997 | Kluger et al. | 222/368 |
| 5,819,991 A * | 10/1998 | Kohn et al. | 222/215 |
| 5,927,558 A * | 7/1999 | Bruce | 222/185.1 |
| 6,036,060 A * | 3/2000 | Munsch et al. | 222/368 |
| 6,266,843 B1 * | 7/2001 | Doman et al. | 15/250.201 |
| 6,698,458 B1 * | 3/2004 | Sollars et al. | 139/389 |
| 6,779,691 B2 | 8/2004 | Cheng | |
| 6,783,154 B2 * | 8/2004 | Persson et al. | 280/743.1 |
| 6,826,991 B1 * | 12/2004 | Rasmussen | 83/334 |
| 7,354,466 B2 * | 4/2008 | Dunning et al. | 55/385.1 |
| 2003/0234264 A1 * | 12/2003 | Landau | 222/368 |
| 2007/0138211 A1 * | 6/2007 | O'Leary et al. | 222/368 |

OTHER PUBLICATIONS

APSCO—Pneumatic Conveying: Dilute Phase Systems, Dense Phase System . . . , dated Nov. 1, 2005.

\* cited by examiner though mechanically suitable for forming a seal at lower pressures, present relatively high friction against the rotating members.

ROTARY VALVE FOR HANDLING SOLID PARTICULATE MATERIAL

TECHNICAL FIELD AND INDUSTRIAL APPLICABILITY OF THE INVENTION

This invention relates to rotary valves of the types suitable for handling a flow of air and solid particulate material.

BACKGROUND OF THE INVENTION

In the art of manufacturing fibrous insulation, conveying mechanisms are often used to transfer material from one location in a facility to another. Typical conveying mechanisms include conveyor belts, roller lines, vibrating platforms, blowers, pneumatic conveying systems and the like.

Pneumatic conveying mechanisms include pressure systems and vacuum systems. In the art, dense phase conveying systems and dilute phase conveying systems are commonly used. Dense phase conveying systems have a low air-to-material ratio. Dense phase systems move material through a conveying line in batches, with discrete material waves or plugs separated by air pockets. Adjusting the system's valves to add less material increases the air pocket size; adding more material reduces the air pocket size.

In contrast, dilute-phase systems have a high air-to-material ratio. The material is often fluidized, or suspended in the airstream, and moves at a relatively high velocity, depending on the particle size and density. This system constantly supplies the material at the pickup point and conveys it to the system's discharge end without interruption, with no waves or plugs of material and no air pockets Many materials may be transferred via the above systems including, but not limited to, clay, carbon black, cement sand, metals, sugar, flour, grains, pellets, chemicals, plastics, pharmaceutical materials such as tablets, and other common materials know in the art.

Another example of a process that uses conveying mechanisms for fibrous insulation material is the production of loose fill fiberglass insulation. Glass is heated in a furnace until molten and then the molten glass is supplied to a fiberizer to form veils or blankets of fiberglass. The fiberglass is then conveyed to a milling apparatus that cuts the fiberglass into smaller bodies or tufts of insulation material. The tufts then pass through a rotary valve in a duct work assembly to be collected for packaging.

The rotary valve typically includes a plurality of metal vanes rotating about a central shaft inside a housing or shell. The housing has inlet and outlet ports on either side. The vanes divide the interior of the housing into multiple isolated moveable compartments.

The rotary valve is often used to move material from areas of high pressure to areas of low pressure or visa versa without significant depressurization. Frequently, the top of the housing is open to allow insulation material to drop in via gravity. The housing is also open at the bottom to allow material to exit the valve via gravity or via an exhaust air stream. Typically, a seal arrangement is included at the end of each vane and engaging the housing inner surface. The ends of the vanes frequently have a seal material attached that slides along the inside of the housing to prevent gas from flowing around the vanes from the high pressure region to the low.

The tufts are typically conveyed through the rotary valve by a high pressure system. Further, the tufts, and gasses associated therewith, are often still significantly heated from the fiber forming process. These and other factors can create wear and tear or otherwise degrade the seals of the rotary valve that maintain the pressure difference.

The seal material is usually a reinforced elastomer. Many times in high-temperature applications, no seal material is used. Instead the metal vanes of the rotary valve are brought to close tolerance with the housing to form the seal.

At high temperatures, for example around 400 degrees Fahrenheit, a process usually requires significant sealing around a large diameter rotary valve. Especially given the large diameter, the seal has to conform to eccentricities and imperfections in the housing. In addition, material can build up around the entrance to the housing and the seal must conform to these local asperities. Materials used for the seals include plastics, such as Teflon™, and elastomers, such as silicon. These seals, however, tended to take a set, wear out, or fracture in this harsh environment.

Further, in an application where the rotary valve must present low friction against the housing, the housing can have inherent variations and eccentricities that would require the seal to have the ability to conform easily to the housing. Elastomeric seals tend to present a high friction coefficient against the housing surface. Solid seals, such as a Teflon™ seal, by DuPont, generally do not provide a tight seal to the housing.

What is needed is an improved rotary valve seal.

SUMMARY OF THE INVENTION

This invention relates in general to rotary valves and in particular to a rotary valve with an improved seal arrangement.

The rotary valve includes a housing having an inner surface. A rotary assembly is positioned for rotation within the housing. The rotary assembly includes a plurality of radially outwardly extending vanes. The vanes extend toward the inner housing surface and are configured to transport material along the inner housing surface. Seal members are mounted upon the vanes. Spring members are secured to the vanes urging the seal members into contact with the inner housing surface.

Another aspect of the present invention the rotary valve includes a generally cylindrical housing having an inner surface. A rotary assembly including a rotatable shaft is disposed within the housing and includes a plurality of radially outwardly extending vanes secured to the shaft for movement relative to the housing. The vanes are configured to transport material along the inner housing surface. Seal members are mounted upon the vanes. The seal members extend at an acute angle relative to the vanes. Spring members are secured to the vanes. The spring members urge the seal members into contact with the inner housing surface.

Various objects and advantages of this invention will become apparent to those skilled in the art from the following detailed description, when read in light of the accompanying drawings.

DETAILED DESCRIPTION AND PREFERRED EMBODIMENTS OF THE INVENTION

Figure 1:
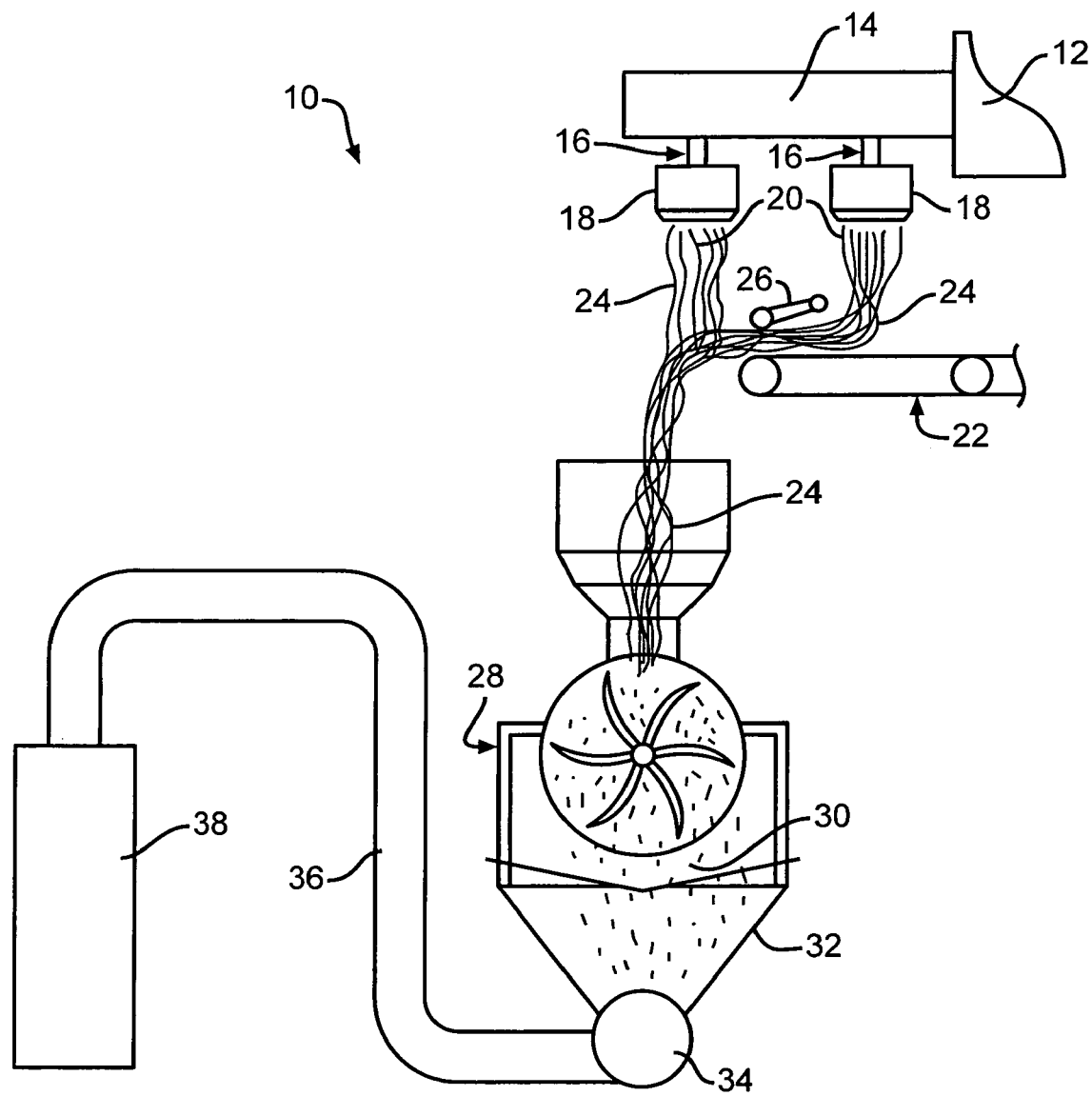
FIG. 1 is a schematic diagram of a system for production of loose fill fiberglass insulation.

Although specific terms are used in the following description for the sake of clarity, these terms are intended to refer generally to the structures of the invention selected for illustration in the Figures, and are not intended to define or limit the scope of the invention. Referring now to the drawings, there is illustrated in FIG. 1 a system 10 for production of loose fill fiberglass insulation. It must be noted that while particular embodiments of the present invention will be described in an environment related to the production of loose fill fiberglass insulation, the present invention is not to be limited to such an environment. It must be understood that the invention may be practiced with any fibrous insulation material, such as any compressible fibrous material made of mineral fibers or polymeric fibers or both.

As can be seen in FIG. 1, streams 16 of molten glass are supplied from a forehearth 14 of a furnace 12 to rotary fiberizers 18 to form veils 20 of glass fibers which are collected to form a fibrous glass blanket 24.

The glass blanket 24 is received by a milling apparatus 28. Optionally, the glass blanket 24 can be received on a belt conveyor 22 and compressed to an appropriate height by an upper conveyor 26 prior to entering the milling apparatus 28. The milling apparatus 28 then cuts the fibrous insulation material in the fibrous blanket 24 into tufts 30 of loose fill fibrous insulation.

A collection duct 32 is attached to the milling apparatus 28 for receiving the tufts 30 and transporting them through a rotary valve 34. A blower/pump (not shown) is connected to at least one of the milling apparatus 28 and the rotary valve 34. The blower/pump creates a pressure differential on either side of the rotary valve 34, with the higher pressure being on the upstream or milling apparatus side of the rotary valve 34. The pressure differential urges the tuft 30 through the rotary valve 34, as will be further described below.

An exit duct 36 is connected to the rotary valve 34 for transporting the tufts 30 to a bagging assembly 38 which bags the fibers for storage and shipment, for example, to a building construction site.

Figure 2:
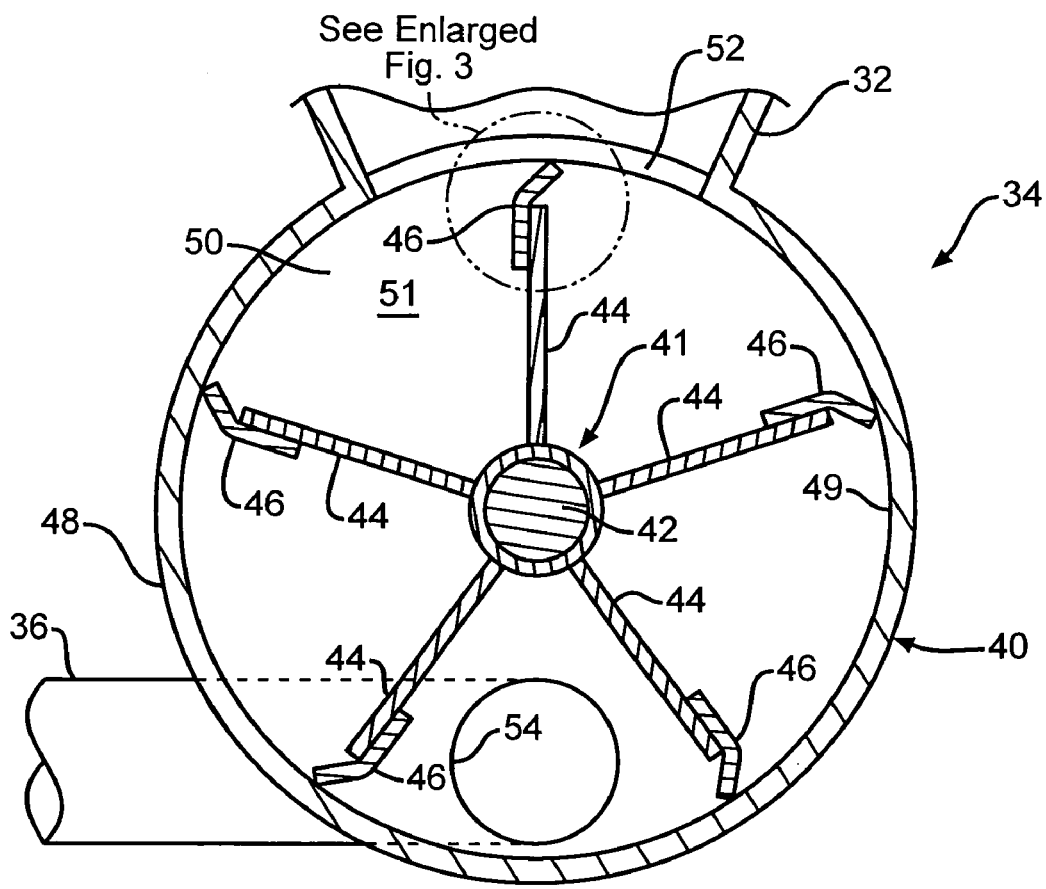
FIG. 2 is a cross-sectional view of a portion of the rotary valve of FIG. 1.

As best shown in FIG. 2, the rotary valve 34 includes a housing 40, a rotary assembly 41, and a plurality of seal arrangements 46. The housing 40 is substantially cylindrical having a substantially cylindrical main body 48 and two substantially circular end caps 50 made from a hardened metal, such as tempered steel. It must be understood, however, that the housing 40 may be made from any suitable components of any suitable material. The main body 48 defines an inner sealing surface 49. The main body 48 and the end caps 50 cooperate to define a valve cavity 51. It must be understood, however, that the housing 40 may have any suitable shape. The main body 48 includes an inlet port 52 for connection to the collection duct 32, thus allowing for entry of the tufts 30 into the rotary valve 34. One of the circular end caps 50 includes an outlet port 54, located generally opposite the inlet port 52, for connection to the exit duct 36, thus allowing for egress of the tufts 30 from the rotary valve 34.

The rotary assembly 41 includes a rotary shaft 42 and a plurality of vanes 44. The rotary shaft 42 extends into the cavity 51 from one circular end cap 50. The rotary shaft 42 is centrally located within the housing 40, thus lying along the central longitudinal axis of the main body 48. It must be understood, however, that the rotary shaft 42 may be placed in any suitable location.

The plurality of vanes 44 are fixed or secured to the rotary shaft 42 for rotational motion therewith, i.e. movement relative to the housing 40. The vanes 44 extend outwardly from the rotary shaft 42 toward the inner surface 49 of the housing 40.

A plurality of seal arrangements 46 are mounted upon the vanes 44 opposite the rotary shaft 42 for sealing engagement with the inner surface 49.

Figure 3:
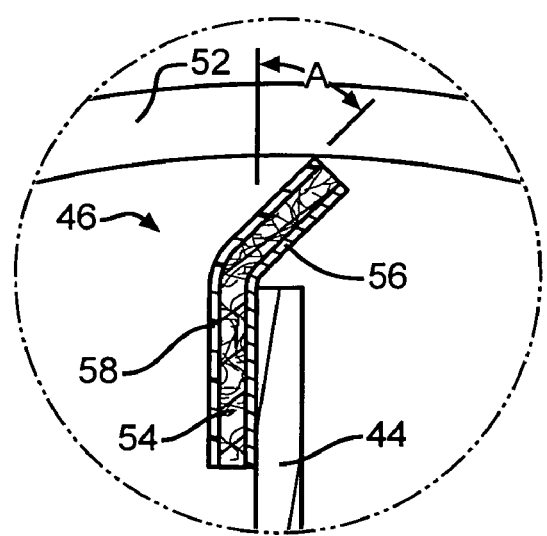
FIG. 3 is an enlarged perspective view of a portion of the rotary valve of FIG. 2 taken at circle 3.

As shown in FIG. 3, the seal arrangement 46 includes a seal member 54, a spring member 56, and a laminate layer 58.

The seal member 54 is mounted upon the vane 44 via the spring member 56, i.e. the seal member 54 is fastened to the spring member 56 and the spring member is fastened to the vane 44. The seal member 54 and the spring member 56 may be fastened to the vane 44 by any suitable arrangement, such as adhesives, welds, or fasteners. Optionally, the seal member 54 is connected to the laminate layer 58 opposite the spring member 56, i.e. the seal member 54 is positioned between the laminate layer 58 and the spring member 56, as shown in FIG. 3. The combination of the seal member 54 and the laminate layer 58 is thus a laminated seal member. The laminate layer 58 may, for example, be a sacrificial layer of plastic or rubber, or any other suitable material. The laminate layer 58 can be provided to add structural integrity to the seal member 54, and thus strengthening the seal member 54. This may be especially desired in the case where the seal member is made from a woven material. Additionally, the laminate layer 58 may be provided as a protective covering for the seal member 54, thus lengthening the life of the seal member 54.

The seal member 54 must have flexibility and is optionally formed of a vulcanized elastomeric polymer. The elastomeric polymer can be of a polyamide, such as nylon. However it must be understood that the seal member may be any other suitable polyamide or any suitable elastomeric polymer. For example, the elastomeric polymer may be a fluoroelastomer, such as a Viton™ elastomer, by DuPont. The seal member 54 can be a woven polyamide, and more particularly can be an aromatic polyamide, such as a Kevlar™ polyamide, by DuPont, although the seal member may be any suitable aromatic polyamide.

The seal member 54 is generally a thin folded or angled rectangular solid, although the seal member 54 may be any suitable shape. The seal member 54 is folded or angled such that the portion of the seal member 54 extends at an acute angle, as shown at an angle of approximately 45 degrees, relative to the vane 44, as indicated at A. Thus, the seal member 54 is folded such that the seal member 54 contacts the inner housing surface 49 at angle of approximately 45 degrees. It must be understood, however, that the seal member may contact the inner housing surface 49 at any suitable angle. For example, the angle of the seal member 45 relative to the inner housing surface 49 may be increased to reduce the resistance that the seal member 54 encounters due to imperfections in the inner housing surface 49. Alternatively, the angle may be decreased to push the seal member 54 tighter to inner housing surface 49 and thus increase the amount of pressure difference for which the seal member 54 will effectively seal.

The spring member 56 secured to the vane 44 urges the seal member 54 into contact with the inner housing surface 49.

The spring member 56 is a flat strip spring formed of metal, such as spring steel. It must be understood, however, that the spring member 56 may be any suitable spring formed from any suitable material in any suitable manner, such as a hinge spring or a series of coil springs with fasteners.

Figure 4:
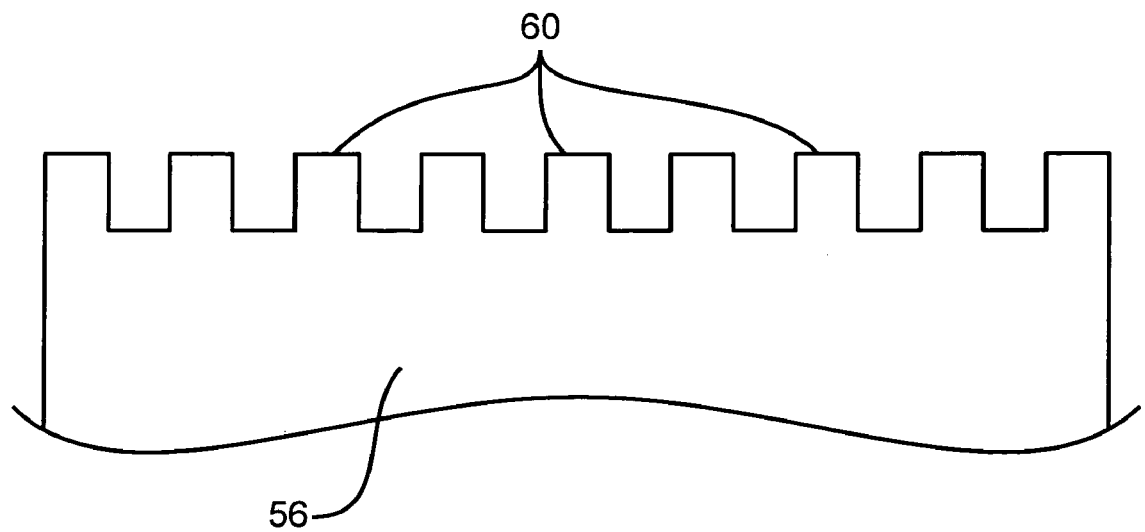
FIG. 4 is a front view of the top portion of the spring member of FIG. 3.

As shown in FIG. 4 the spring member 56 optionally includes a plurality of spring fingers 60. The spring fingers 60 allow the seal member 54 to make localized adjustments when passing across physical surface imperfections of the inner housing surface 49, while still maintaining sufficient overall pressure to seal the seal member 54 against the inner housing surface 49.

The seal arrangement 46 provides a good air seal, especially around a large diameter rotary valve, such as the valve 34. Additionally, the seal arrangement 46 conforms well to the eccentricities and imperfections in the housing 40. Further, when insulation material builds up around the inlet port 52, the seal arrangement 46 conforms to these local asperities. Due to the resiliency of the seal member 54 in cooperation with the applied force of the spring member 56, the seal arrangement 46 presents low friction, as compared to less resilient and fixed prior art seal arrangements, against the inner housing surface 49, while conforming to the inherent variations and eccentricities of the inner housing surface 49.

The spring member 56 and the sealing member 54 cooperate to apply a constant but relatively light force against the inner housing surface 49. If, during operation, the seal arrangement 46 encounters an asperity in the inner housing surface 49, the seal arrangement 46 conforms locally without significantly stressing or damaging the seal member 54. The fingers 60 thus allow for isolation of the forces relative to the seal member 54 should an obstruction be encountered. Further, the apply force of the spring member 56 may adjusted by changing the angle A, by changing the thickness of the spring member 56, by changing the material of composition of the seal member 54 or the spring member 56, by changing the number, size, or stiffness of the spring fingers 60, or by changing the general configuration of the spring member 56.

The seal member 54 should be sufficiently stiff to seal against the inner housing surface 49, while being flexible, e.g. deformable and elastic, enough to adjust to any imperfection in the inner housing surface 49. It is also desirable that the seal member 54 be significantly durable, especially to lengthen the life of the seal member 54 under high temperature circumstances. It must be understood, however, that the seal member may be formed from any suitable material, such as a woven plastic, a solid foam, or a spongeable or cellular material The spring member 56 should have sufficient stiffness and/or thickness as to act as a backbone or support member for the seal member 54. The spring member 56 may be formed from any suitable material, such as a spring metal or plastic, and formed to any suitable dimensions. It must be understood, however, that the spring member may be formed from any suitable material in any suitable form, such as a resilient elastomeric cushion, metallic coil spring, or hydraulic or pneumatic shock absorbers.

Additionally, it must be understood that once sufficiently worn, the seal arrangement 46 may be replaced with an unworn seal arrangement 46 to maintain the performance of the seal arrangement 46. The ease of replacement may be facilitated by the used of threaded fasteners such as nuts and bolts or screws and washers.

Figure 5:
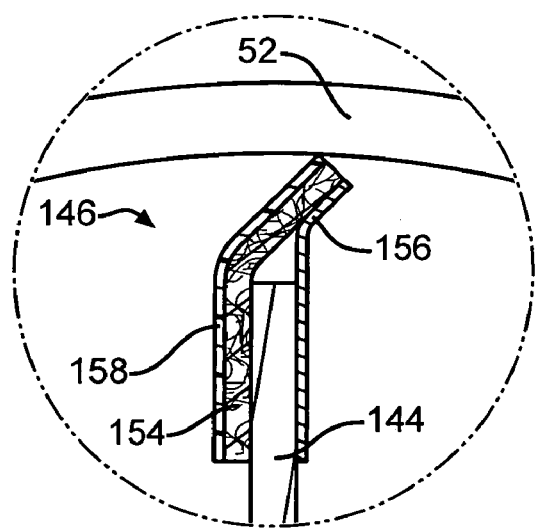
FIG. 5 is a side view of a portion of a rotary valve in accordance with a second embodiment of the present invention.

Illustrated in FIG. 5 is a seal arrangement 146 in accordance with a second embodiment of the present invention. The seal arrangement 146 includes a seal member 154 mounted directly upon a vane 144, i.e. the seal member 154 is directly fastened to the vane 144. The spring member 156 is fastened to the vane opposite the seal member 154, i.e. with the vane 144 between the seal member 154 and the spring member 156. The seal member 154 and the spring member 156 may be fastened to the vane 144 by any suitable arrangement, such as adhesives, welds, or fasteners. The seal member 154 is connected to a laminate layer 158 opposite the vane 144.

The present invention may be practiced with pneumatic conveying equipment known in the art. Pneumatic conveying is a system used to transport a wide variety of dry powdered and granular materials in a gas stream. Generally, the gas stream will be air but in special cases dried, cooled, heated air or inert gas such as nitrogen may be used. In its basic form, the material (solids) is fed into a moving air stream which blows the material down a length of pipe. The pipe is connected to a receiver or cyclone where the air and material are separated.

Pneumatic conveying systems utilize either a vacuum system or a pressure system. Both pneumatic pressure conveying systems and vacuum conveying systems may be further classified into either a dense-phase system or a dilute-phase system. A dense-phase system has a low air-to-material ratio. In dense-phase systems, the conveying velocity is below the saltation level, the critical level at which particles of material fall from suspension in the airstream. A dense-phase system moves the material through the conveying line in batches, with discrete material waves or plugs separated by air pockets. Adjusting the system's valves to add less material increases the air pocket size; adding more material reduces the air pocket size.

In contrast, a dilute-phase system has a high air-to-material ratio. The material is most often fluidized, or suspended, in the airsteam, and moves at a relatively high velocity, depending on the particle size and density. The dilute-phase system constantly supplies the material at the pickup point and conveys it to the system's discharge end without interruption, with no waves or plugs of material and no air pockets.

Materials which may be conveyed in a dense-phase pressure conveying system include those where material degradation or conveying line erosion is of concern. Such materials could be abrasive or nonabrasive, fluidizable, free-flowing, granular, non-compressible, pelletized or uniformly sized materials. Materials which may be conveyed in a dense-phase vacuum system include friable materials, blended materials, sticky materials, fine materials and abrasive materials. These products include sugar, pet food products, carbon black prills, plastic pellets, detergents, etc.

Materials which may be conveyed in a dilute-phase pressure conveying system include but are not limited to, dry bulk materials. Types of materials include adhesive and cohesive materials, materials which are hard to fluidize, nonpermeable materials, sticky materials, and very fine materials. Examples include, but are not limited to, chemicals, starches, flour, sugar, pharmaceuticals, beans, chips, granulates, instant powders, capsules, cohesive powders, briquettes, plastic, small parts, nuts, beads, pigments, powders, dispersible agglomerates, carbon prill, abrasive powders, salts, sand, sprayed granules, tablets, etc.

Materials which may be conveyed in a dilute-phase vacuum conveying system include coarse, lightweight particles, fibrous material, and non-abrasive materials. Examples include, but are not limited to, flours, resins and compounds, specialty chemicals, ground feeds, and granular and pelletized products.

While the principle and mode of operation of this invention have been explained and illustrated with regard to particular embodiments, it must be understood, however, that this invention may be practiced otherwise than as specifically explained and illustrated without departing from its spirit or scope.

What is claimed is:

1. A rotary valve configured to handle fibrous insulation material, the rotary valve comprising;
   a housing having an inner surface;
   a rotary assembly positioned for rotation within the housing and including a plurality of radially outwardly extending vanes that extending toward the inner housing surface and are configured to transport fibrous insulation material along the inner housing surface; and
   seal arrangements mounted upon the vanes, each seal arrangement including a seal member mounted upon a vane and positioned between a laminate member and a spring member, the seal member being configured to continuously extend at an acute angle from the vane to the inner surface of the housing;
   wherein the spring members urge the seal arrangements into contact with the inner housing surface.

2. The rotary valve of claim 1 wherein the rotary assembly further includes a rotatable shaft disposed within the housing, the vanes secured to the shaft for movement relative to the housing.

3. The rotary valve of claim 1 wherein the spring members bias the seal members against the inner housing surface with a force and the seal members are sufficiently resilient such that the seal members locally accommodate irregularities in the inner housing surface.

4. The rotary valve of claim 1 wherein the housing is generally cylindrical.

5. The rotary valve of claim 1 wherein the seal members are directly fastened to the vanes.

6. The rotary valve of claim 1 wherein the rotary valve is operable to perform at 400 degrees Fahrenheit.

7. The rotary valve of claim 1 wherein the seal members are directly fastened to the spring members.

8. The rotary valve of claim 1 wherein the seal members contact the inner housing surface at an angle of approximately 45 degrees.

9. The rotary valve of claim 1 wherein the seal members are formed of an elastomeric polymer.

10. The rotary valve of claim 9 wherein the elastomeric polymer is a polyamide.

11. The rotary valve of claim 10 wherein the polyamide is a woven polyamide.

12. The rotary valve of claim 10 wherein the polyamide is an aromatic polyamide.

13. The rotary valve of claim 9 wherein the elastomeric polymer is one of a fluoroelastomer and a vulcanized elastomeric polymer.

14. The rotary valve of claim 1 wherein the seal members are laminated seal members.

15. The rotary valve of claim 1 wherein the spring members are flat strip springs.

16. The rotary valve of claim 15 wherein the flat strip springs include a plurality of spring fingers.

17. The rotary valve of claim 16 wherein the flat strip spring is formed of metal.

18. The rotary valve of claim 17 wherein the metal is spring steel.

19. A rotary valve configured to handle fibrous insulation material, the rotary valve comprising;
    a generally cylindrical housing having an inner surface;
    a rotary assembly including a rotatable shaft disposed within the housing and including a plurality of radially outwardly extending vanes secured to the shaft for movement relative to the housing, the vanes being configured to transport fibrous insulation material along the inner housing surface; and
    seal arrangements mounted upon the vanes, each seal arrangement extending at an acute angle relative to the vanes, each seal arrangement including a seal member positioned between a laminate member and a spring member, the seal member being configured to continuously extend at an acute angle from the vane to the inner surface of the housing;
    wherein the spring members urge the seal arrangements into contact with the inner housing surface.

* * * * *